Patented Aug. 21, 1945

2,383,043

UNITED STATES PATENT OFFICE 2,383,043

STABILIZATION OF POLYMERIZABLE COMPOUNDS

Edwin L. Cline, Philadelphia, Pa., assignor to Allied Chemical & Dye Corporation, New York, N. Y., a corporation of New York No Drawing. Application June 26, 1943, Serial No. 492,419

14 Claims. (Cl. 260—486)

This invention relates to the stabilization of polymerizable unsaturated organic compounds, particularly stabilization of such compounds, during storage and distillation, as are susceptible to polymerization catalyzed by air and organic peroxides.

Preparatory to production of resins or plastics from polymerizable materials such as styrene and its homologs, acrylates, and vinyl esters, and similar polymerizable unsaturated materials that tend to polymerize upon contact with air, upon heating, or merely upon standing for long periods of time, the polymerizable material is commonly prepared, processed and stored in monomeric form. It has been proposed heretofore to stabilize such monomeric polymerizable material against polymerization during storage, distillation or other processing, by addition of various substances such as quinone, hydroquinone, or other phenolic materials. Stabilizers heretofore suggested, however, have been disadvantageous on several grounds. In some instances, they have not been effective enough stabilizers to prevent polymerization during necessary processing of the monomeric material carried out at somewhat elevated temperatures. In other instances, stabilizers have been employed whose removal from the monomeric material has been necessary to produce a satisfactory resin or plastic upon subsequent polymerization, and the removal of these stabilizers has presented considerable difficulty. In still other instances such large quantities of the stabilizers have been necessary to prevent polymerization of the monomeric material that the use of such stabilizers has been economically disadvantageous.

It is an object of this invention to provide a new and advantageous method of stabilizing styrene compounds and other polymerizable organic materials the polymerization of which is catalyzed by air or organic peroxides.

It is a further object of this invention to provide a stabilized monomeric form of polymerizable material of the type above described such that the material in monomeric form may be stored, or may even be subjected to processing operations such as distillation at somewhat elevated temperatures, without loss of material and degradation of product because of polymerization during such storage or processing.

I have discovered that the monomeric form of polymerizable unsaturated organic compounds, the polymerization of which is catalyzed by air or organic peroxides such as benzoyl peroxide, for example the monomeric form of polymerizable styrene compounds, acrylates and vinyl esters, may be stabilized against polymerization during storage or during such processing as distillation at somewhat elevated temperatures by addition thereto of a hematoxylinoid material, i. e. hematoxylin, hematein, or mixtures thereof, in very small proportions. Thus, I have found that as little as 0.0005% by weight of hematoxylin, based on the monomeric material (i. e. 5 parts by weight hematoxylin per million parts monomeric material), may be sufficient for substantial stabilization of the monomer at temperatures up to 100-110° C.

Hematoxylin, the preferred form of the new polymerization inhibitor of my invention, is a high-molecular-weight phenolic material having the empirical formula $C_{16}H_{14}O_6$, and believed to have the structure:

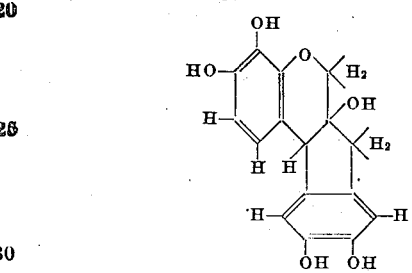

This material is a naturally occurring substance readily obtainable by extraction from logwood. Hematein is a product easily formed by mild oxidation of hematoxylin, e. g. by air oxidation, and generally occurs in small amounts in the hematoxylin recovered from logwood. It is believed to be a quinoid form of hematoxylin; conversely, hematoxylin may be looked upon as the leuco form of hematein. The expression "hematoxylinoid material" is used herein to denote the materials of this oxidation-reduction system, and is intended to include only hematoxylin, hematein, and mixtures of the two.

The polymerizable unsaturated organic materials that may be stabilized by addition of a hematoxylinoid material, as above stated, are the polymerizable unsaturates, the polymerization of which is catalyzed by air or organic peroxide; for example, unsaturates that may be polymerized to form solid polymers upon treatment with benzoyl peroxide under the following conditions: Addition of 0.01-1.0% of benzoyl peroxide followed by heating at 50-125° C. for 6 to 24 hours. Such polymerizable unsaturates include monomeric styrene compounds such as styrene and its polymerizable homologs (e. g. paramethylstyrene); acrylates such as methylmethacrylate; and vinyl esters such as vinyl acetate.

A hematoxylinoid material as above described is effective to stabilize the monomeric form of these unsaturates against heat polymerization and against polymerization of the type catalyzed by air or organic peroxides; i. e. the hematoxylinoid material is an effective stabilizer under the conditions generally met with during storage and such processing as distillation. The stabilizer of my invention is effective for monomeric material in the form of a product consisting substantially 100% of the polymerizable monomer or in the form of a product in which the monomer is dissolved or dispersed in a diluent such as an organic solvent for the material. Such a monomeric material stabilized by addition of a hematoxylinoid material in accordance with my invention is a new and advantageous product having a surprising stability in storage and upon distillation as compared to previous monomeric products of this type stabilized by polymerization inhibitors heretofore known.

In practicing my invention, the hematoxylinoid material is added to the monomeric material, preferably after the monomeric material has undergone any chemical treatments such as washing with alkali that would remove a phenolic substance such hematoxylin. The hematoxylinoid material may advantageously be added, for example, prior to the final distillation of the chemically refined monomeric material to inhibit polymerization during distillation or after the final distillation to inhibit polymerization during subsequent storage and shipment. The hematoxylinoid material may also advantageously be added to crude monomeric material at any stage of its processing when it is to be subjected to distillation or is to be stored for a period of time. In order that the hematoxylinoid material may exert its stabilizing effect satisfactorily, it is advantageous to carry out distillations at temperatures under about 100° C., e. g., by use of vacuum or steam.

As above pointed out, in some cases as little as 5 parts hematoxylin per million parts monomeric material is adequate for stabilization of the monomer for an extended period of time at about 100° C. The minimum quantity of hematoxylin employed for stabilization depends in each case on the particular monomer to be stabilized, the conditions of treatment during which stabilization is desired, and the period of time for which stabilization is desired. Thus I have found the minimum amount of hematoxylin that would exert any substantial stabilizing effect on a styrene compound is 0.0005% by weight, based on the monomeric material; the minimum amount for an acrylate is 0.0008%; and the minimum amount for a vinyl ester is 0.0005%. My work has indicated that somewhat greater minimum amounts of hematein are generally required. I have further found that in the various treatments and conditions commonly met with in the preparation, processing and storage of the above monomeric materials, a maximum of less than 1% by weight of hematoxylinoid material, based on the monomeric material, will generally be adequate for stabilization. However, the use of a larger amount of hematoxylinoid material is not harmful except from the economic standpoint of waste of inhibitor material.

Generally a somewhat larger minimum amount of stabilizer is necessary to stabilize the monomeric material against polymerization at the elevated temperatures employed in distillation, e. g. at temperatures around 100° C., than is necessary for stabilization of the monomeric material at atmospheric temperatures, e. g., the temperatures met with during storage or shipment. Thus, less than 0.005% by weight of hematoxylin, I have found, is more than adequate to stabilize monomeric styrene against polymerization for more than 100 days storage at 30° C., whereas it is desirable to use 0.02% by weight of hematoxylin to stabilize the same monomeric styrene against polymerization during distillation at temperatures close to 100° C.

When it is desired to employ the monomer for production of resin or plastic, the stabilizer may be readily removed, if considered desirable, by washing the monomeric material with caustic soda solution, or by distillation under 100° C., taking off the monomer material as distillate, and leaving the stabilizer as residue. In many instances when the monomeric material contains only sufficient stabilizer to inhibit polymerization during storage and shipment, and the monomeric material is to be polymerized at an elevated temperature, it is unnecessary to remove the stabilizer; i. e. the very small amount of stabilizer used to stabilize the material during storage and shipment is not sufficient to modify the course of polymerization carried out at an elevated temperature.

The following examples are illustrative of the process and product of my invention:

*Example 1*

515 gallons of 98%–100% monomeric styrene containing 0.029 weight percent of hematoxylin was subjected to distillation under vacuum at a temperature of about 100° C. The distillation required about 20 hours' time. At the conclusion of the distillation the still residue was measured and it was found that 1.6% of the styrene had been polymerized during distillation.

For purposes of comparison, another batch of 520 gallons of the same monomeric styrene was distilled after addition as inhibitor of 0.96% of a mixture of phenolic compounds boiling in the range 250°–300° C. The distillation was carried out at about the same temperature and for about the same period of time. After distillation, it was found that 3.6% of the styrene charge had been polymerized during distillation.

*Example 2*

0.02% by weight of hematoxylin was added to a 98%–100% monomeric styrene material, the mixture was held at 100° C., and the rate of polymerization was measured. The induction period, i. e., the elapsed time before the mixture polymerized at the same rate as if no inhibitor were present, was 29 hours.

This test was repeated employing 0.05% hydroquinone as stabilizer. In this case the induction period was found to be 13 hours.

*Example 3*

A number of samples of methylmethacrylate, substantially 100%, were treated with varying amounts of hematoxylin as shown below, the samples were exposed to daylight at room temperature, and the condition of the samples at various periods was noted. The results are tabulated below:

| Sample No. | Inhibitor | 49 to 51 days | 63 to 65 days | 98 to 100 days | 129 to 131 days |
|---|---|---|---|---|---|
| 1 | None | Soft gel. | Solid. | Solid. | Solid. |
| 2 | Hematoxylin 0.0008% | Fluid. | Soft gel. | do | Do. |
| 3 | Hematoxylin 0.0016% | do | Fluid. | do | Do. |
| 4 | Hematoxylin 0.016% | do | do | Fluid. | Fluid. |

*Example 4*

Hematoxylin was added to a number of samples of vinyl acetate, substantially 100%, in varying amounts as shown below. The samples were exposed to daylight at room temperature and their condition was noted at various times. The results are tabulated below:

| Sample No. | Inhibitor | 88 days | 116 days | 119 days |
|---|---|---|---|---|
| 1 | None | Fluid | Viscous. | Viscous. |
| 2 | Hematoxylin 0.00055% | do | Fluid. | Fluid. |
| 3 | Hematoxylin 0.0011% | do | do | Do. |

*Example 5*

Hematoxylin was added to a number of samples of the same vinyl acetate as in Example 4 in varying amounts, as shown below. The samples were held at 100° C. and their condition was noted at various times. The results are tabulated below:

| Sample No. | Inhibitor | 3 days | 4 days | 9 days |
|---|---|---|---|---|
| 1 | None | Fluid | Viscous. | Soft gel. |
| 2 | Hematoxylin 0.0005% | do | Fluid. | Fluid. |
| 3 | Hematoxylin 0.001% | do | do | Do. |
| 4 | Hematoxylin 0.002% | do | do | Do. |

The hematoxylin employed in the above examples generally contained a small amount of hematein in admixture.

Since certain changes in carrying out the above process, and certain modifications in the composition which embody the invention may be made without departing from its scope, it is intended that all matter contained in the above description shall be interpreted as illustrative and not in a limiting sense.

I claim:

1. A method for stabilizing a monomeric polymerizable unsaturated organic compound selected from the group consisting of polymerizable styrene compounds, acrylates and vinyl esters, against polymerization during storage and handling at atmospheric and somewhat elevated temperatures, which comprises mixing a small proportion of hematoxylinoid material with the monomeric material.

2. A method for stabilizing a monomeric polymerizable unsaturated organic compound selected from the group consisting of polymerizable styrene compounds, acrylates and vinyl esters, against polymerization at temperatures up to about 100° C., comprising mixing hematoxylin with the monomeric material in the proportion of at least five parts hematoxylin per million parts monomeric material.

3. A method for stabilizing a monomeric polymerizable styrene compound against polymerization during storage and handling at atmospheric temperatures, comprising mixing a small proportion of hematoxylinoid material with the monomeric material.

4. A method for stabilizing a monomeric polymerizable vinyl ester against polymerization during storage and handling at atmospheric temperatures, comprising mixing a small proportion of hematoxylinoid material with the monomeric material.

5. A method for stabilizing a monomeric polymerizable acrylate against polymerization during storage and handling at atmospheric temperatures, comprising mixing a small proportion of hematoxylinoid material with monomeric material.

6. A method for stabilizing monomeric styrene against polymerization during distillation, comprising mixing at least about .02% by weight of hematoxylin with the monomeric material.

7. A liquid composition comprising a monomeric polymerizable unsaturated organic compound selected from the group consisting of polymerizable styrene compounds, acrylates and vinyl esters, and hematoxylinoid material present in amount sufficient to inhibit polymerization of the monomeric material at temperatures up to about 100° C.

8. A liquid composition comprising a monomeric polymerizable unsaturated organic compound selected from the group consisting of polymerizable styrene compounds, acrylates and vinyl esters, and hematoxylin present in a proportion amounting to at least 5 parts hematoxylin per million parts monomeric material and sufficient to inhibit polymerization of the monomeric material at atmospheric temperatures.

9. A liquid composition comprising a monomeric polymerizable styrene compound and hematoxylinoid material present in a proportion amounting to at least 5 parts hematoxylinoid material per million parts monomeric material and sufficient to inhibit polymerization of the monomeric material during storage and handling at atmospheric temperatures.

10. A liquid composition comprising a monomeric polymerizable vinyl ester and hematoxylinoid material present in a proportion amounting to at least 5 parts hematoxylinoid material per million parts monomeric material and sufficient to inhibit polymerization of the monomeric material during storage and handling at atmospheric temperatures.

11. A liquid composition comprising a monomeric polymerizable acrylate and hematoxylinoid material present in a proportion amounting to at least 5 parts hematoxylinoid material per million parts monomeric material and sufficient to inhibit polymerization of the monomeric material during storage and handling at atmospheric temperatures.

12. A liquid composition comprising monomeric styrene and hematoxylin present in amount sufficient to inhibit polymerization of the monomeric material at atmospheric temperatures.

13. A liquid composition comprising monomeric vinyl acetate and hematoxylin present in amount sufficient to inhibit polymerization of the monomeric material at atmospheric temperatures.

14. A liquid composition comprising monomeric methylmethacrylate and hematoxylin present in amount sufficient to inhibit polymerization of the monomeric material at atmospheric temperatures.

EDWIN L. CLINE.